(12) United States Patent
Frey et al.

(10) Patent No.: US 12,344,223 B2
(45) Date of Patent: Jul. 1, 2025

(54) DISTRIBUTED BRAKING ARCHITECTURE WITH IMPROVED SAFETY

(71) Applicant: SAFRAN LANDING SYSTEMS, Velizy-Villacoublay (FR)

(72) Inventors: Olivier Frey, Moissy-Cramayel (FR); Dominique Onfroy, Moissy-Cramayel (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 175 days.

(21) Appl. No.: 18/248,266

(22) PCT Filed: Oct. 6, 2021

(86) PCT No.: PCT/EP2021/077596
§ 371 (c)(1),
(2) Date: Apr. 7, 2023

(87) PCT Pub. No.: WO2022/074063
PCT Pub. Date: Apr. 14, 2022

(65) Prior Publication Data
US 2023/0373450 A1   Nov. 23, 2023

(30) Foreign Application Priority Data
Oct. 8, 2020 (FR) ...................... 2010313

(51) Int. Cl.
*B60T 8/88* (2006.01)
*B60T 8/17* (2006.01)
(Continued)

(52) U.S. Cl.
CPC .......... *B60T 8/885* (2013.01); *B60T 8/1703* (2013.01); *B60T 8/92* (2013.01); *B60T 13/746* (2013.01);
(Continued)

(58) Field of Classification Search
CPC .......... B60T 8/885; B60T 8/1703; B60T 8/92; B60T 13/746; B60T 17/18;
(Continued)

(56) References Cited

U.S. PATENT DOCUMENTS 8,948,994 B2 * 2/2015 Frank .................... B60T 8/1703
                                                                  244/110 A
9,862,365 B2 * 1/2018 Al-Tabakha .......... B60T 13/662
(Continued)

FOREIGN PATENT DOCUMENTS

EP   3 476 677 A2   5/2019
EP   3 483 063 A1   5/2019
(Continued)

OTHER PUBLICATIONS

International Search Report mailed Jan. 19, 2022, issued in corresponding International Application No. PCT/EP2021/077596, filed Oct. 6, 2021, 6 pages.
(Continued)

Primary Examiner — Kurt Philip Liethen
(74) Attorney, Agent, or Firm — CHRISTENSEN O'CONNOR JOHNSON KINDNESS PLLC

(57) ABSTRACT

A wheel-braking system architecture for an aircraft is provided. The architecture includes a friction brake; an electromechanical actuator associated with a power module connected to a digital communication module by a first driver module; and a controller having both a power supply unit for powering the power module by delivering a power supply voltage (Vc) thereto, and also a control unit connected to the digital communication unit in order to transmit a digital control signal to the digital communication module. The control unit can be connected to the driver unit by an analog wired connection in order to transmit that to a first analog braking order from which the first driver module
(Continued)

drives the power module to produce a degraded power supply current for the actuator.

11 Claims, 4 Drawing Sheets

(51) Int. Cl.
*B60T 8/92* (2006.01)
*B60T 13/74* (2006.01)
*B60T 17/18* (2006.01)
*B64C 25/42* (2006.01)
*H02P 3/04* (2006.01)

(52) U.S. Cl.
CPC .............. *B60T 17/18* (2013.01); *B64C 25/42* (2013.01); *H02P 3/04* (2013.01); *B60T 2270/402* (2013.01); *B60T 2270/413* (2013.01)

(58) Field of Classification Search
CPC ......... B60T 2270/402; B60T 2270/413; B60T 8/325; B60T 13/662; B60T 13/741; B64C 25/42; B64C 25/44; H02P 3/04
See application file for complete search history.

(56) References Cited

U.S. PATENT DOCUMENTS

| | | | |
|---|---|---|---|
| 11,873,080 B2 * | 1/2024 | Chico | B60T 17/22 |
| 2008/0001471 A1 * | 1/2008 | Rudd | B60T 8/1764 303/3 |
| 2008/0258014 A1 * | 10/2008 | McCoskey | B60L 53/12 244/221 |
| 2008/0258548 A1 * | 10/2008 | May | B60T 8/17616 303/139 |
| 2009/0240412 A1 * | 9/2009 | Cahill | B64C 25/44 303/20 |
| 2010/0332095 A1 * | 12/2010 | Colin | B60T 13/741 701/70 |
| 2013/0253736 A1 * | 9/2013 | Frank | B60T 13/741 701/3 |
| 2015/0217748 A1 * | 8/2015 | Chico | B60T 8/1703 701/3 |
| 2017/0082163 A1 * | 3/2017 | Serra | B60T 17/22 |
| 2020/0101953 A1 * | 4/2020 | Onfroy | B64C 25/46 |

FOREIGN PATENT DOCUMENTS

| | | |
|---|---|---|
| EP | 3 632 795 A1 | 4/2020 |
| FR | 3 044 296 A1 | 6/2017 |

OTHER PUBLICATIONS

Written Opinion mailed Jan. 19, 2022, issued in corresponding International Application No. PCT/EP2021/077596, filed Oct. 6, 2021, 7 pages.

* cited by examiner

DISTRIBUTED BRAKING ARCHITECTURE WITH IMPROVED SAFETY

The present invention relates to the field of braking system architectures for aircraft, and more particularly to so-called "distributed" braking system architectures.

BACKGROUND OF THE INVENTION

Braking system architectures for aircraft are known that comprise brakes for braking respective wheels of the aircraft. Such a brake comprises friction members and at least one electromechanical actuator for applying a braking force against the friction members in order to exert braking torque on the wheel. In a braking system architecture that is centralized, the electromechanical braking actuator is connected via a power line to centralized calculation means including means for generating electric current for powering the electrical actuator. Conventionally, the centralized calculation means receive status information coming from the brake and/or from the electromechanical actuator in order to implement a servocontrol loop and adjust the magnitude of the electric current. Such a braking system architecture requires a considerable volume of wired connections connecting the actuator and also each of the status sensors to the centralized calculation means. For aircraft fitted with a plurality of electromechanical braking actuators, it is necessary to establish a respective specific power line between the calculation means and each of the electromechanical actuators. These wired connections represent weights that is considerable.

Patent application FR3044296 describes a braking system architecture for aircraft comprising a brake and an electromechanical actuator for applying a braking force against the brake. The electromechanical actuator comprises an electric motor, a power module for generating power supply current for the electric motor, and a digital communication module. The braking architecture further comprises a controller having a power supply unit for powering the power module by supplying it with a power supply voltage, and a control unit connected to a digital communication unit for producing digital control signals for controlling the electric motor and for transmitting them to the first digital communication module. In operation, the digital communication module transmits the digital control signals to the power module so that the power module generates power supply current based on the digital control signals and taken from the power supply voltage. The control unit is connected to a digital communication network of the aircraft and the power supply unit is connected to a power distribution network of the aircraft. Such an architecture relies on communication infrastructure for the digital control signals, which infrastructure comprises in particular a communication network, a network management protocol, a protocol for communication within the network, one or more routers, and one or more digital communication modules. If a failure in the communication infrastructure affects a common element such as the network or one of the protocols, then that failure could lead to a total loss of braking capacity for the aircraft.

OBJECT OF THE INVENTION

A particular object of the invention is to improve the reliability of a distributed architecture for an electric braking system.

SUMMARY OF THE INVENTION

To this end, the invention provides an architecture for an aircraft wheel braking system, the architecture comprising a friction brake; a first electromechanical actuator having a first electric motor and a first power module connected to a first digital communication module by a first driver module; a controller comprising a power supply unit arranged to deliver a power supply voltage (Vc) to the first power module and a control unit including a digital communication unit for transmitting a digital control signal to the first digital communication module. The first power module is arranged to receive the digital control signal and to transmit it to the first driver module in order to drive the first power module in such a manner that the first power module generates a first nominal power supply current based on the digital control signal and taken from the power supply voltage. A first wired connection of analog type connects together the control unit and the first driver module. The control unit is arranged to send a first analog braking order to the first driver module by means of the first wired connection, and the first driver module is arranged to drive the first power module to generate a first degraded power supply current based on the first analog braking order and taken from the power supply voltage, thereby causing the wheel to the braked.

A distributed braking architecture is thus obtained that includes a connection that is dissimilar from the digital connection and thus insensitive to problems that might affect the digital connection.

Braking is distributed more uniformly when the brake includes a second electromechanical actuator in order to apply a braking force on the friction members and thereby exert a braking torque on the wheel. The second electromechanical actuator comprises: a second electric motor, a second power module for generating a second power supply current for the second electric motor and taken from the power supply voltage delivered by the power supply unit, the second power module being connected to a second digital communication module by a second driver module, the second digital communication module being arranged to receive the digital control signals and to transmit them to the second driver module in order to drive the second power module in such a manner that the second power module generates a second nominal power supply current based on the digital control signals and taken from the power supply voltage.

Advantageously, the first and second digital communication modules are interconnected to form a digital network.

Preferably, the control unit is connected to the second driver module by a second wired connection of analog type and is arranged to send a second analog braking order to the second driver module by means of the second wired connection. The second driver module is arranged such a manner as to drive the second power module so as to generate a second degraded power supply current based on the second analog braking order and taken from the power supply voltage, thereby causing the wheel to the braked.

Advantageously, the first wired connection and/or the second wired connection is a unidirectional connection.

It is possible to regulate the braking when the braking architecture includes first estimator means for estimating a first braking power developed by the first electromechanical actuator.

Advantageously, the first estimator means comprise a first current sensor for measuring the current that is consumed by the first electric motor and/or a first movement sensor for sensing movement of a first movable member of the first electric motor.

In the event of the digital communication unit or the digital module failing, it continues to be possible to regulate braking when the first driver module is arranged to control generation of the first degraded current as a function of information delivered by the first estimator means.

The invention also provides a braking method performed within such an architecture by the controller and that comprises the following steps:

transmitting a braking setpoint to the control unit, and then:

in a nominal mode:

generating a digital control signal from the braking setpoint;

transmitting the digital control signal to the first driver module by means of the digital communication unit;

using the first driver module and the digital control signal to generate a first command for the first power module;

using the first power module to generate a first nominal power supply current based on the first command and taken from the power supply voltage;

using the first digital communication module to transmit a first braking-power signal to the controller, the first braking-power signal being representative of a first braking power developed by the first electromechanical actuator;

causing the control unit to generate an adjusted digital control signal based on the first braking-power signal and the first nominal value;

transferring the adjusted digital control signal by means of the digital communication unit; and using the first driver module to generate a first nominal power supply current based on the adjusted digital control signal and taken from the power supply voltage; and and in a degraded mode:

using the control unit to convert the braking setpoint into a degraded analog braking order;

using the first wired connection to transfer the degraded analog braking order to the first driver module;

using the first driver module and the degraded analog braking order to generate a first degraded command for the first power module; and using the first power module to generate a first degraded power supply current based on the first degraded command and taken from the power supply voltage.

Advantageously, the first actuator includes first estimator means for estimating a first braking power developed by the first electromechanical actuator, and the first driver module is arranged to control the generation of the first degraded current as a function of information delivered by the first estimator means, the method comprising the following additional steps:

in the degraded mode:

using the first driver unit to define an adjusted value for the degraded braking current as a function of the information delivered by the first estimator means and of the degraded analog braking order; and using the first power module to generate a first degraded braking current adjusted to the adjusted value and taken from the power supply voltage.

The invention also provides an aircraft provided with a braking architecture as described above.

Other characteristics and advantages of the invention appear on reading the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

The invention is described below as implemented in an aircraft 1000 having a plurality of main undercarriages 100, 200, and 300, each carrying a plurality of so-called "braked" wheels, i.e. a plurality of wheels, each fitted with a respective brake for braking the aircraft 1000. The present description relates to a single braked wheel, but the invention naturally applies in the same manner to all or some of the braked wheels of the aircraft.

Figure 1:
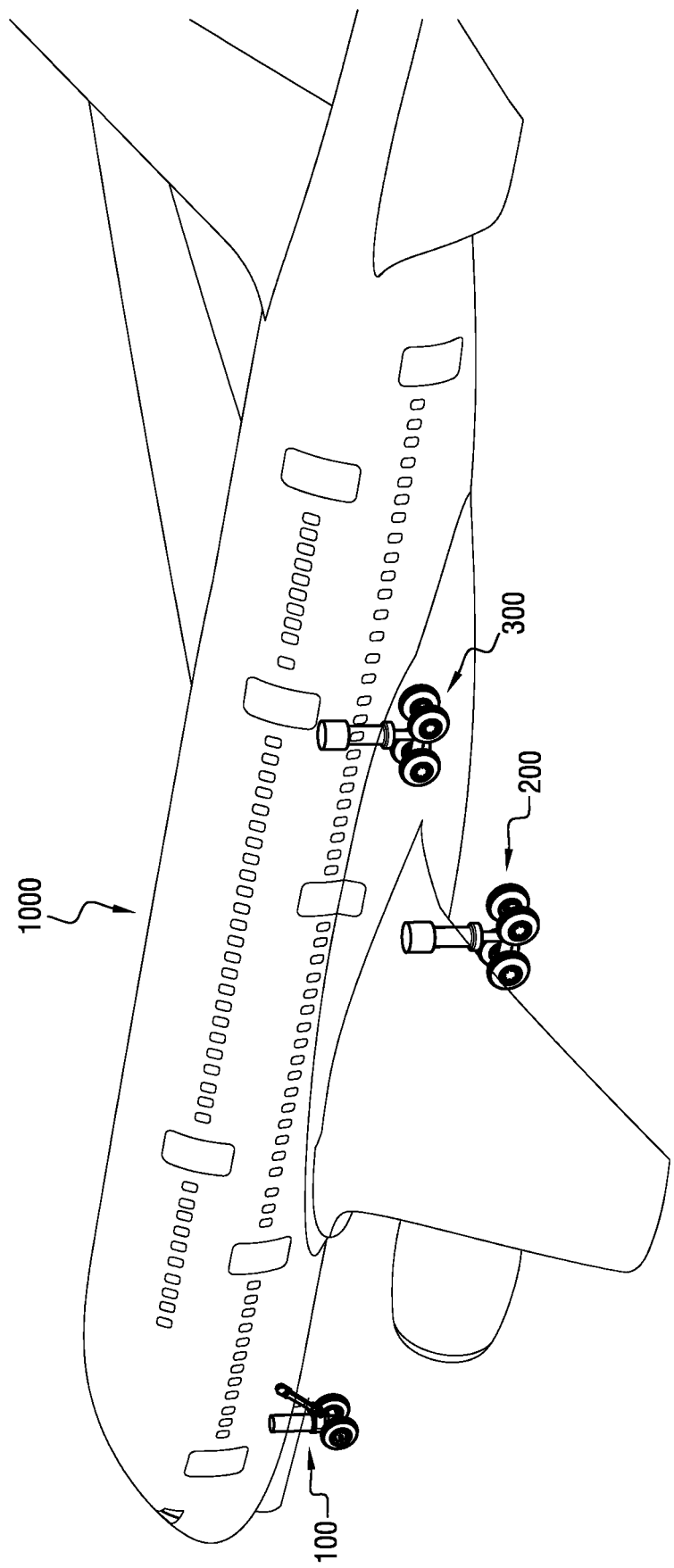
FIG. 1 is a diagrammatic view of an aircraft of the invention.
Figure 2:
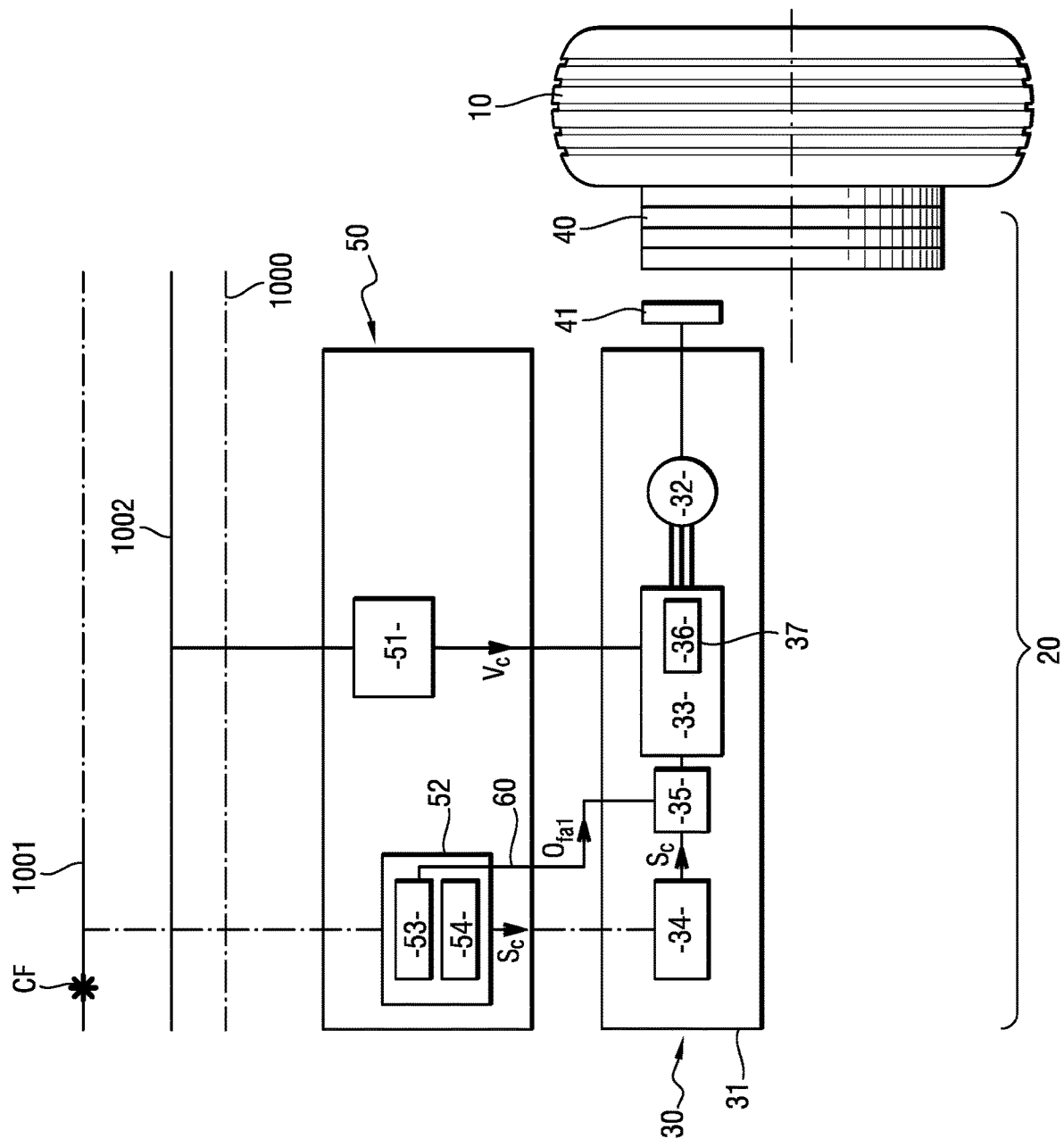
FIG. 2 is a block diagram of a braking architecture in a first embodiment of the invention.

With reference to FIG. 2, a braking system architecture in a first embodiment of the invention includes a brake 20 for braking one of the wheels 10 of the aircraft. The brake 20 has a first electromechanical actuator 30 and friction members, specifically a stack 40 of carbon disks secured to the wheel 10. The electromechanical actuator 30 is used to apply a pressure force against the stack 40 of carbon disks and thereby exert a braking torque on the wheel 10. The first electromechanical actuator 30 comprises a first body 31 that is fastened to the main undercarriage 100, and in this embodiment it incorporates a first three-phase electric motor 32, a first power module 33, and a first digital communication module 34. The first power module 33 and the first digital communication module 34 are connected together by a first driver module 35. A first pusher 41 is actuated by the first electric motor 32 to slide and apply the pressure force against the stack 40 of carbon disks.

The braking system architecture of the invention also comprises a controller 50 comprising both a control unit 52 and also a power supply unit 51 that is connected to the first power module 33. The control unit 52 comprises a processor unit 53 and a digital communication unit 54 that are connected to the first digital communication module 34.

The control unit 52 is connected to a digital communication network 1001 of the aircraft 1000, and the power supply unit 51 is connected to a power distribution network 1002 of the aircraft 1000, specifically a network delivering a direct current (DC) voltage.

The power supply unit 51 powers the first power module 33 by supplying it with a DC power supply voltage Vc. The first power module 33 is arranged to generate alternating current (AC) power that flows through the three phases of the first electric motor 32 whenever it is appropriate to actuate the first pusher 41 and thus to brake the wheel 10. For this purpose, the first power module 33 includes a first inverter 36 comprising a plurality of first switches 37 that are controlled by the first driver module 35 so as to transform the DC power supply voltage into a three-phase AC voltage at which the first power supply current of the first electric motor 32 is generated.

The first driver module 35 comprises an electronic circuit that is connected to the first power module 33 and that is arranged to control the first switches 37 of the first inverter 36 as a function of an order from the first digital communication module 34.

As can be seen in FIG. 2, a first wired connection 60 of analog type connects together the control unit 52 and the first driver module 35. In this example, the first wired connection 60 is a simple two-conductor copper cable transmitting an analog signal (specifically a voltage) unidirectionally from the processor unit 53 to the first driver module 35. The first driver unit 35 transforms the received analog signal into a specific configuration of the first switches 37 of the first inverter 36. Thus, applying a voltage across the terminals of the first wired connection 60 serves to control a discrete change of state of the first switches 37.

In operation, when the pilot of the aircraft 1000 acts on a brake control, that generates a braking setpoint Cf, which is transmitted by the digital communication network 1001 the controller 50. In a nominal mode of operation, the processor unit 53 uses the braking setpoint Cf to generate a digital control signal Sc for controlling the first motor 32. The digital control signal Sc is transmitted to the first digital communication module 34 by the digital communication unit 54. The first digital communication module 34 transmits the digital control signal Sc to the first driver module 35, which establishes a first command for the first power module 33, specifically in the form of a first configuration of the first switches 37 of the first inverter 36 of the first power module 33, which then generates a first nominal power supply current $I_{n1}$ based on the digital control signal Sc and taken from the power supply voltage Vc. Under the effect of the first nominal power supply current $I_{n1}$ applied to the first motor 32, the first pusher 41 presses against the stack 40 of disks, thereby exerting a nominal braking torque on the wheel 10.

In the event of a failure in the communication infrastructure, e.g. such as a hardware failure affecting the communication network (router, digital communication unit 54, first digital communication module 34) or such as a software failure affecting a network management protocol or a communication protocol, known devices for monitoring operation inform the controller 50, which then switches to a degraded mode for controlling braking.

In this degraded mode, the processor unit 53 converts the braking setpoint Cf into a first analog braking order $O_{af1}$, specifically a voltage for application to the terminals of the wired connection 60.

The processor unit 53 transfers the first analog braking order $O_{af1}$ to the first driver module 35 via the first wired connection 60. The first driver module 35 converts the first analog braking order $O_{af1}$ into a first degraded command for the first power module 33, specifically in the form of a configuration of the first switches 37 of the first inverter 36. The first driver module transmits the first degraded command to the first power module 33, which then generates a first degraded power supply current $I_{d1}$. Under the effect of the first degraded power supply current $I_{d1}$ applied to the first motor 32, the first pusher 41 presses against the stack 40 of disks, thereby exerting a degraded braking torque on the wheel 10.

Figure 3:
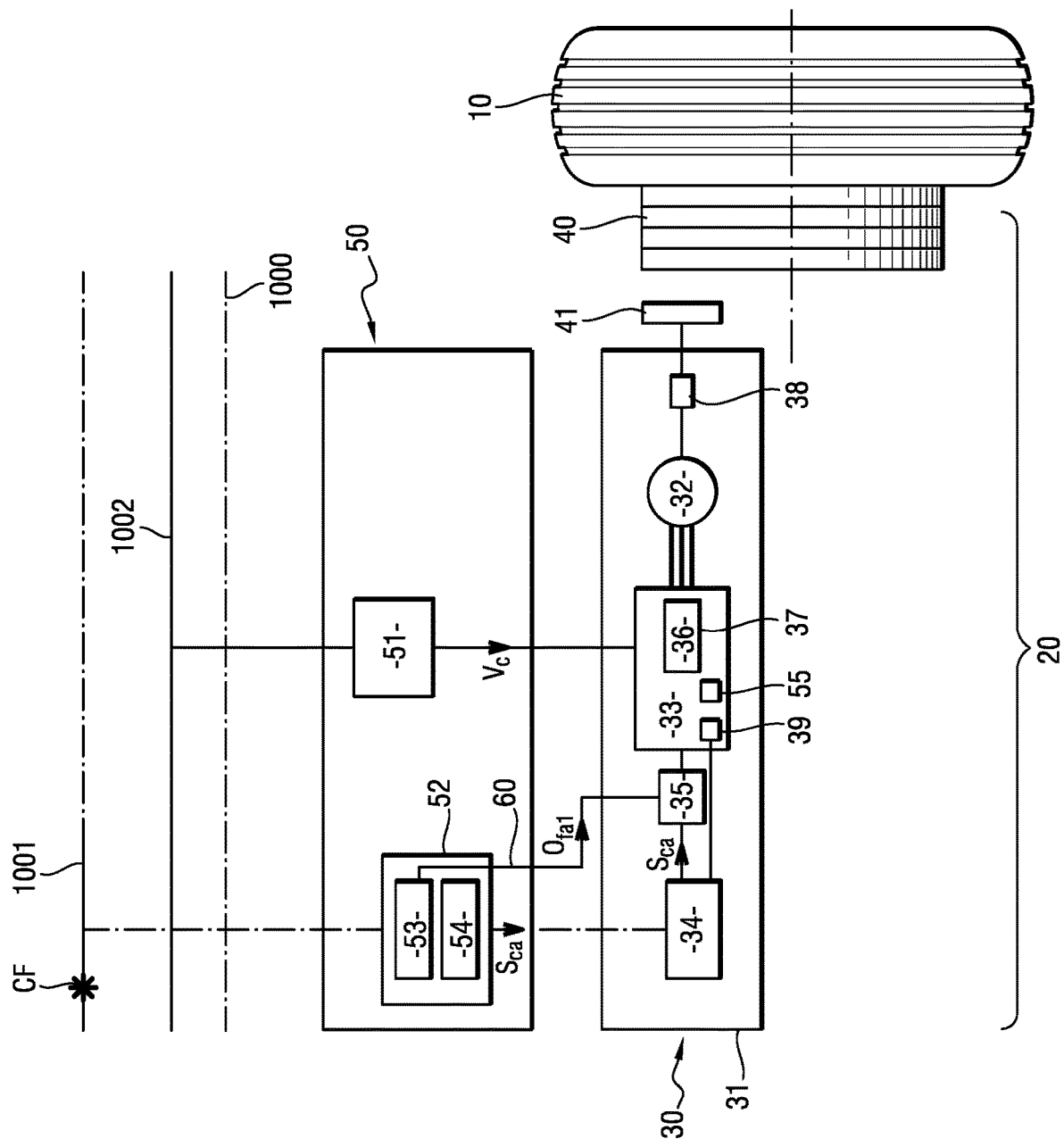
FIG. 3 is a block diagram of a braking architecture in a second embodiment of the invention.

In a second embodiment as shown in FIG. 3, the first power module 33 of the first electromechanical actuator 30 includes a first current sensor 55 for sensing the current consumed by the first electric motor 32 and a first movement sensor 38 for sensing movement of the first pusher 41, which sensors are connected to the first driver module 35. The first current sensor 55 and the first movement sensor 38 for sensing movement of the first pusher 41 are also connected to the first digital communication module 34.

In this second embodiment, in normal mode, the first digital communication module 34 communicates the first braking-power signal coming from the first movement sensor 38 for sensing movement of the first pusher 41 and also the second braking-power signal coming from the first current sensor 55 to the controller 50. The processor unit 53 uses the first braking-power signal provided by the first movement sensor 38 for sensing movement of the first pusher 41, the second braking-power signal provided by the first current sensor 55, and the first nominal value for the first nominal power supply current $I_{n1}$ in order to generate a first adjusted digital control signal Sca. The digital communication unit 54 transfers the first adjusted nominal digital control signal Sca to the first digital communication module 34. The first digital communication module 34 transmits the adjusted digital control signal Sca to the first driver module 35, which establishes a configuration for the first switches 37 of the first inverter 36 of the first power module 33. The first power module 33 then generates a first adjusted nominal power supply current $I_{n1a}$ based on the digital control signal Sc and taken from the power supply voltage Vc. Under the effect of the first adjusted nominal power supply current $I_{n1a}$ applied to the first motor 32, the first pusher 41 presses against the stack 40 of disks, thereby exerting an adjusted nominal braking torque on the wheel 10. On the basis of the information provided by the first movement sensor 38 and by the first current sensor 55, the value of the first adjusted nominal power supply current $I_{n1a}$ is constantly updated, thereby servocontrolling the first adjusted nominal power supply current $I_{n1a}$ on the movement of the pusher 41 and on the current consumed by the motor 32.

In this second embodiment, in degraded mode, the first driver unit 35 defines a new first adjusted value for a first adjusted degraded power supply current $I_{d1a}$ as a function of the first braking-power signal provided by the first movement sensor 38 for sensing movement of the first pusher 41, of the second braking-power signal provided by the first current measurement sensor 55, and of the first degraded analog braking order $O_{af1}$ in order to establish a configuration for the first switches 37 of the first inverter 36 of the first power module 33. The first power module 33 then generates the first adjusted degraded power supply current $I_{d1a}$ at a magnitude equal to the new first adjusted value for the first degraded power supply current. Under the effect of the first adjusted degraded power supply current $I_{d1a}$ applied to the first motor 32, the first pusher 41 presses against the stack 40 of disks, thereby exerting an adjusted degraded braking torque on the wheel 10.

Such (nominal and degraded) servocontrol loops are implemented for all braking operations.

Figure 4:
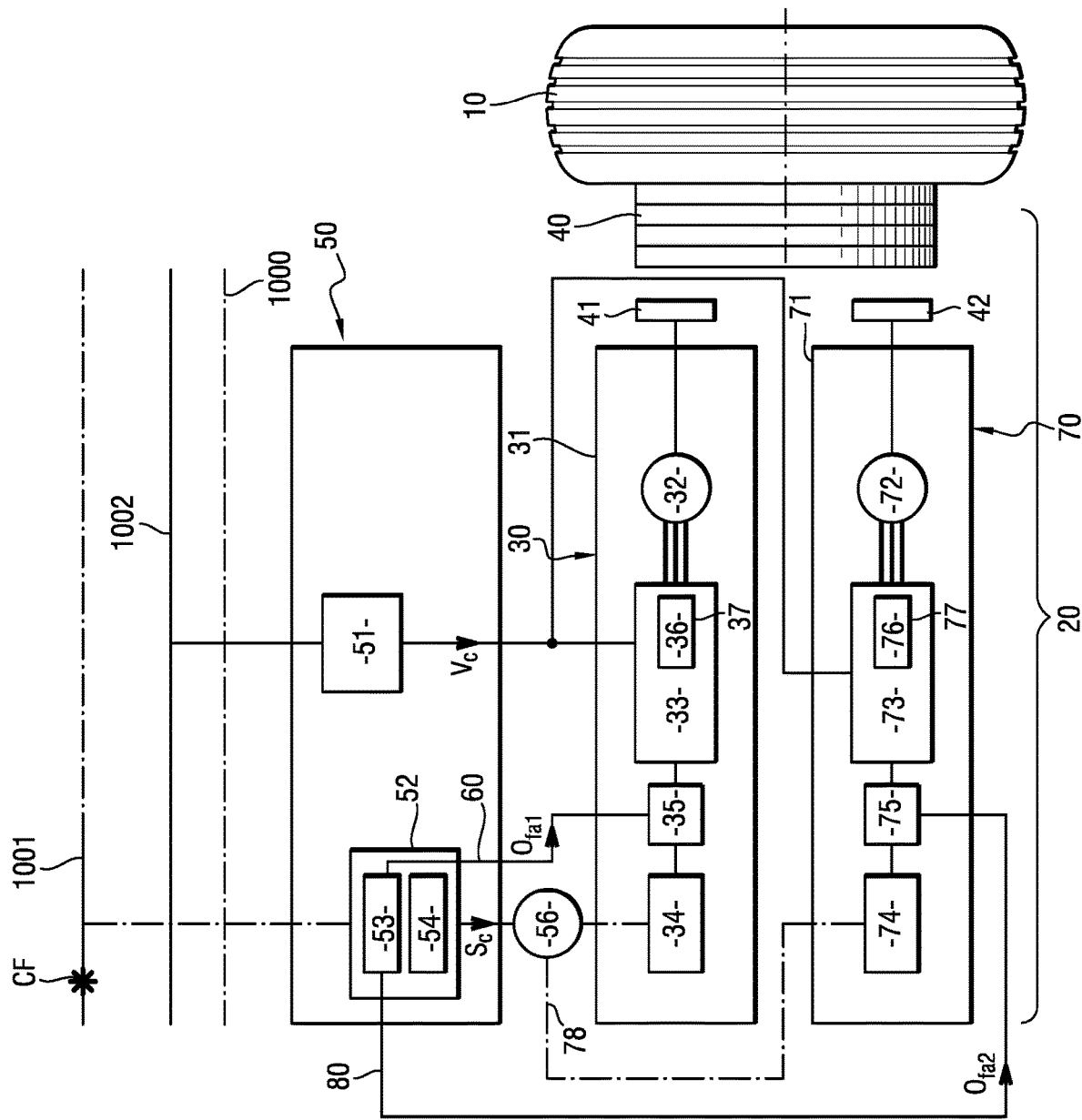
FIG. 4 is a block diagram of a braking architecture in a third embodiment of the invention.

In a third embodiment as shown in FIG. 4, the brake 20 includes a second electromechanical actuator 70 for applying a pressure force on the stack 40 of carbon disks. The second electromechanical actuator 70 comprises a second body 71 that is fastened to the undercarriage 100, and it incorporates a second electric motor 72, a second power module 73, and a second digital communication module 74. The second power module 73 and the second digital communication module 74 are connected together by a second driver module 75. A second pusher 42 is actuated by the second electric motor 72 to slide and apply the pressure force against the stack 40 of carbon disks. The second power module 73 is connected to the power supply unit 51. The first digital communication module 34 and the second digital communication module 74 are connected to the digital communication unit 54 via a network switch 56 in order to form a digital network 78. At this point, it should be observed that it would be entirely possible to use some other network interconnection member, such as a router or a concentrator (or "hub"), instead of the network switch.

The power supply unit 51 powers the second power module 73 by supplying it with the DC power supply voltage Vc. The second power module 73 is arranged to generate AC power that flows through three phases of the second electric motor 72 whenever it is appropriate to actuate the second pusher 42 and thus to brake the wheel 10. For this purpose, the second power module 73 includes a second inverter 76 comprising a plurality of second switches 77 that are controlled by the second driver module 75 so as to transform the DC power supply voltage into a three-phase AC voltage at which the second power supply current of the second electric motor 72 is generated.

The second driver module 75 comprises an electronic circuit that is connected to the second power module 73 and that is arranged to control the second switches 77 of the second inverter 76 as a function of an order from the second digital communication module 74.

As can be seen in FIG. 4, a second wired connection 80 of analog type connects together the control unit 52 and the second driver module 75. In this example, the second wired connection 80 is a simple two-conductor copper cable transmitting an analog signal (specifically a voltage) unidirectionally from the processor unit 53 to the second driver module 75. Thus, applying a voltage across the terminals of the second wired connection 80 serves to control a discrete change of state of the second switches 77.

In operation, when the pilot of the aircraft acts on a brake control instrument, that generates a braking setpoint Cf, which is transmitted by the digital communication network 1001 the controller 50. In a normal mode of operation, the processor unit 53 uses the braking setpoint Cf to generate a digital control signal Sc for controlling the first motor 32 and the second motor 72. The digital control signal Sc is transmitted by the digital communication module 54 to the network switch 56, which delivers it via the network 78 to the first digital communication module 34 and to the second digital communication module 74. The first digital communication module 34 and the second digital communication module 74 transmit the digital control signal Sc respectively to the first driver module 35 and to the second driver module 75. The first driver module 35 and the second driver module 75 act respectively to establish a configuration for the first switches 37 of the first inverter 36 of the first power module 33 and a second configuration for the second switches 77 of the second inverters 76, which then generate a first nominal power supply current $I_{n1}$ and a second nominal power supply current $I_{n2}$ based on the digital control signal Sc and taken from the power supply voltage Vc. Under the effect of the first nominal power supply current $I_{n1}$ applied to the first motor 32 and of the second nominal power supply current $I_{n2}$ applied to the second motor 72, the first pusher 41 and the second pusher 42 both press against the stack 40 of disks, thereby exerting a nominal braking torque on the wheel 10.

In degraded braking mode, the processor unit 53 converts the braking setpoint Cf into a first analog braking order $O_{af1}$ and a second analog braking order $O_{af2}$. In the event that the first and second braking orders $O_{af1}$ and $O_{af2}$ are identical, the same a voltage is applied to the terminals of the first wired connection 60 and of the second wired connection 80.

The processor unit 53 transfers the first analog braking order $O_{af1}$ to the first driver module 35 by means of the first wired connection 60 and the second analog braking order $O_{af2}$ to the second driver module 75 by means of the second wired connection 80. The first driver module 35 establishes a configuration for the first switches 37 of the first inverter 36 of the first power module 33, which then generates a first degraded power supply current $I_{d1}$. The second driver module 75 establishes a configuration for the second switches 77 of the second inverter 76 of the second power module 73, which then generates a second degraded power supply current $I_{d2}$. Under the effect of the first degraded power supply current $I_{d1}$ applied to the first motor 32 and of the second degraded power supply current $I_{d2}$ applied to the second motor 72, the first pusher 41 and the second pusher 42 both press against the stack 40 of disks, thereby exerting a degraded braking torque on the wheel 10.

Naturally, the invention is not limited to the embodiment described, but covers any variant coming within the ambit of the invention as defined by the claims.

In particular:
although above the motor is a three-phase motor, the invention applies equally to other types of motor, e.g. such as a single-phase motor;
although above the wired connection comprises a two-conductor copper cable, the invention applies equally to other ways of arranging the wired connection, e.g. such as a cable having a single conductor or having more than two conductors;
although above the braking setpoint is transmitted to the controller by the digital communication network of the aircraft, the invention applies equally to the braking setpoint being transmitted by other means, e.g. such as a single analog connection, a chain of analog connections, a mixture of transmission techniques, transmission by radio, by mechanical cable, or by hydraulic control;
although above the wired connection is unidirectional, the connection could be bidirectional;
although above the architecture includes a current sensor and a movement sensor for sensing movement of the pusher, the invention applies equally to other power estimator means for estimating a first braking power, e.g. such as a temperature sensor for sensing the temperature of the stack of disks, a tachometer linked to the wheel, a braking torque sensor, or an aircraft speed sensor;
the power estimator means are optional;
although above the first and second digital communication modules are interconnected to form a digital network, the invention applies equally to other types of connection between the first digital communication module and the second digital communication module, e.g. such as a point-to-point connection;
although above the digital control signal comprises identical instructions for the first and second actuators, the invention applies equally to a digital signal comprising respective different instructions for each of the actuators.

The invention claimed is:
1. A wheel-braking system architecture for an aircraft, the wheel-braking system architecture comprising:
a friction brake;
a first electromechanical actuator comprising a first body incorporating a first electric motor and a first power module connected to a first digital communication module by a first driver module; and
a controller comprising:
a power supply unit configured to supply a power supply voltage to the first power module; and a control unit including a digital communication unit for transmitting a digital control signal to the first digital communication module, the first digital communication module being configured to receive the digital control signal and to transmit it to the first driver module to drive the first power module in such a manner that the first power module generates a first nominal power supply current based on the digital control signal and taken from the power supply voltage, wherein the control unit is connected to the first driver module by a first wired connection of analog type and is configured to send a first analog braking order to the first driver module by the first wired connection, and wherein the first driver module is configured to drive the first power module to generate a first degraded power supply current based on the first analog braking order and taken from the power supply voltage, thereby causing the wheel-braking system architecture to apply the friction brake to a wheel.

2. The wheel-braking system architecture of claim 1, wherein the friction brake includes:
a second electromechanical actuator having a second electric motor; and
a second power module connected to a second digital communication module by a second driver module,
wherein the second digital communication module is configured to receive the digital control signal and to transmit them to the second driver module in order to drive the second power module in such a manner that the second power module generates a second nominal power supply current based on the digital control signals and taken from the power supply voltage.

3. The wheel-braking system architecture of claim 2, wherein the first and second digital communication modules are interconnected to form a digital network.

4. The wheel-braking system architecture of claim 2, wherein the second wired connection of analog type connects together the control unit and the second driver module, the control unit being configured to send a second analog braking order to the second driver module by the second wired connection, the second driver module being configured to drive the second power module to generate a second degraded power supply current based on the second analog braking order and taken from the power supply voltage, thereby causing the wheel-braking system architecture to apply the friction brake to the wheel.

5. The wheel-braking system architecture of claim 1, wherein the first wired connection is a unidirectional connection.

6. The wheel-braking system architecture of claim 1, further including first estimator means for estimating a first braking power developed by the first electromechanical actuator.

7. The wheel-braking system architecture of claim 6, wherein the first estimator means comprise a first current sensor for measuring the current consumed by the first electric motor and/or a first movement sensor for measuring movement of a first movable member of the first electric motor.

8. The wheel-braking system architecture of claim 6, wherein the first driver module is arranged to control the generation of the first degraded current as a function of information delivered by the first estimator means.

9. A braking method performed by the wheel-braking system architecture of claim 1, the method comprising:
transmitting a braking setpoint to the control unit, and then:
in a nominal mode:
generating a digital control signal from the braking setpoint by the controller, and transferring the digital control signal to the first digital communication module via the digital communication unit;
using the first power module to generate a first nominal power supply current based on the digital control signal and taken from the power supply voltage;
transmitting a first braking-power signal to the controller via the first digital communication module, the first braking-power signal being representative of a first braking power developed by the first electromechanical actuator;
causing the control unit to generate an adjusted digital control signal based on the first braking-power signal and on the first nominal value;
transferring the adjusted digital control signal to the first digital communication module via the first digital communication unit; and
causing the first power module to generate a first adjusted nominal power supply current based on the adjusted digital control signal and taken from the power supply voltage; and
in a degraded mode:
converting the braking setpoint into a degraded analog braking order by the control unit;
transferring the degraded analog braking order to the first driver module via the first wired connection;
using the first driver module to generate a first degraded command for the first power module based on the degraded analog braking order; and
causing the first power module to generate a first degraded power supply current based on the first degraded command and taken from the power supply voltage.

10. The method of claim 9, wherein the first actuator includes first estimator means for estimating a first braking power developed by the first electromechanical actuator, and wherein the first driver module is configured to control the generation of the first degraded power supply current as a function of information delivered by the first estimator means, the method including the following additional steps:
in the degraded mode:
using the first driver unit to define an adjusted value for the degraded power supply current as a function of the information delivered by the first estimator means and of the degraded analog braking order; and
using the first power module to generate a first adjusted degraded power supply current of value equal to the adjusted value for the degraded power supply current as defined by the first driver unit and taken from the power supply voltage.

11. An aircraft including the wheel-braking system architecture of claim 1.

* * * * *